US007006031B1

(12) United States Patent
Abatzoglou et al.

(10) Patent No.: US 7,006,031 B1
(45) Date of Patent: Feb. 28, 2006

(54) INTERRUPT SAR IMAGE RESTORATION USING LINEAR PREDICTION AND RANGE MIGRATION ALGORITHM (RMA) PROCESSING

(75) Inventors: Theagenis J. Abatzoglou, Huntington Beach, CA (US); Leo H. Hui, Alhambra, CA (US); Kwang M. Cho, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/968,780

(22) Filed: Oct. 19, 2004

(51) Int. Cl.
*G01S 13/90* (2006.01)
(52) U.S. Cl. .................... 342/25 A; 342/195; 342/159; 342/25 F; 342/25 D; 342/196
(58) Field of Classification Search ............. 342/25 R, 342/25 A–25 F, 159–162, 194–196
See application file for complete search history.

(56) References Cited

U.S. PATENT DOCUMENTS

| | | | | | |
|---|---|---|---|---|---|
| 4,975,704 | A | * | 12/1990 | Gabriel et al. ............ | 342/25 C |
| 5,243,349 | A | * | 9/1993 | Mims ....................... | 342/25 A |
| 5,383,457 | A | * | 1/1995 | Cohen ........................ | 600/443 |
| 5,937,102 | A | * | 8/1999 | Jin ............................. | 382/276 |
| 6,018,306 | A | * | 1/2000 | Serbin ...................... | 342/25 A |
| 6,492,932 | B1 | * | 12/2002 | Jin et al. .................. | 342/25 R |
| 6,661,369 | B1 | * | 12/2003 | Cho .......................... | 342/25 R |

(Continued)

FOREIGN PATENT DOCUMENTS

JP 59065274 A * 4/1984

(Continued)

OTHER PUBLICATIONS

"Accelerated skew coordinate transformation for high resolution SAR image formation", Tsuboi, A.; Maeda, A.; Komura, F. Acoustics, Speech, and Signal Processing, IEEE Int'l Conference on ICASSP '86. vol. 11, Apr. 1986 Ps: 2859-2862.*

*Primary Examiner*—John B. Sotomayor
(74) *Attorney, Agent, or Firm*—Leonard A. Alkov; Karl A. Vick

(57) ABSTRACT

SAR images are improved by a method for acquiring a synthetic aperture image from a sequence of periodic pulse returns where the sequence of periodic pulse returns is interspersed with interrupts, i.e. missing pulses. The interrupts mark the start and end of one or more segments, where the segments contain the periodic pulse returns form the SAR image. The method comprises the steps of:
converting said pulse returns into a digital stream;
performing an azimuth deskew on said digital stream to obtain a deskewed digital stream;
forming a forward-backward data matrix from the deskewed digital stream for one or more segments;
forming an average segment covariance from the forward-backward data matrix;
computing a model order for the average segment covariance;
computing one or more linear prediction coefficients using data contained in the forward backward data matrix, and model order;
using the linear prediction coefficients to compute missing pulse returns belonging within the interrupts.

The computation for extrapolating the missing pulse returns is introduced after the Stolt interpolator in RMA processing. In computing the model order, eigenvalues are found and compared to a threshold. Roots of a linear prediction polynomial are computed, then stabilized to obtain stabilized roots. Linear prediction coefficients are reconstituted using the stabilized roots. Sub-bands are used to decrease computing time for the missing pulse returns.

10 Claims, 9 Drawing Sheets

U.S. PATENT DOCUMENTS

| | | | |
|---|---|---|---|
| 6,670,907 B1 * | 12/2003 | Cho | 342/25 R |
| 6,781,541 B1 * | 8/2004 | Cho | 342/195 |
| 6,795,590 B1 * | 9/2004 | Chen | 382/294 |
| 6,873,285 B1 * | 3/2005 | Carrara et al. | 342/25 R |

FOREIGN PATENT DOCUMENTS

| | | | |
|---|---|---|---|
| JP | 61050083 A | * | 3/1986 |
| JP | 61194379 A | * | 8/1986 |

* cited by examiner

INTERRUPT SAR IMAGE RESTORATION USING LINEAR PREDICTION AND RANGE MIGRATION ALGORITHM (RMA) PROCESSING

This invention was made with Government support under Contract No. F19628-00-C-0100 awarded by the Department of the Air Force. The Government has certain rights in this invention.

BACKGROUND OF THE INVENTION

1. Field of Invention

This invention is in the field of Synthetic Aperture Radar (SAR) imaging where some of the pulses making up the image are missing.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform for a high resolution image.

The plurality of returns creating a SAR image generated by the transmitted pulses along a known path of the platform make up a frame length. During the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length (aperture).

The plurality of pulses transmitted during an SAR frame length, when coherently combined and processed, result in image quality comparable to a longer antenna, corresponding approximately to the "length" traveled by the antenna during the frame length. The clarity of a SAR image is in many respects dependent on the quality of the motion compensation applied to each radar return prior to SAR image computation as well as on the existence of full information descriptive of the SAR image, i.e. a complete set of radar returns. The SAR process depends on the coherent, phase accurate summing of all radar returns expected within a frame. Missing pulses during the acquisition of the image introduce distortions over the whole SAR image, such as increased sidelobes, thereby reducing the SAR image clarity.

The Range Migration Algorithm (RMA), a popular way to focus the radar returns forming a SAR image, is derived assuming the radar returns arrive at a generally fixed, known rate, determined by the pulse repetition rate and/or the analog to digital conversion rate. If radar returns descriptive of the SAR image are not regular in their arrival, certain functions within the processing, such as FFTs, cannot function as expected and the image becomes blurred.

SUMMARY OF THE INVENTION

SAR images are improved by a method for acquiring a synthetic aperture image from a sequence of periodic pulse returns where the sequence of periodic pulse returns is interspersed with interrupts, i.e. missing pulses. The interrupts mark the start and end of one or more segments, where the segments contain the periodic pulse returns form the SAR image. The method comprises the steps of:

converting said pulse returns into a digital stream;

performing an azimuth deskew on said digital stream to obtain a deskewed digital stream;

forming a forward-backward data matrix from said deskewed digital stream for said one or more segments;

forming an average segment covariance from said forward-backward data matrix;

computing a model order for said average segment covariance;

computing one or more linear prediction coefficients using data contained in said forward backward data matrix, and said model order;

using said one or more linear prediction coefficients to compute missing pulse returns belonging within said interrupts.

The computation for extrapolating the missing pulse returns is introduced after the Stolt interpolator in RMA processing.

In computing the model order, eigenvalues are found and compared to a threshold. Roots of a linear prediction polynomial are computed, then stabilized to obtain stabilized roots. Linear prediction coefficients are reconstituted using the stabilized roots.

Sub-bands are used to decrease computing time for the missing pulse returns.

DETAILED DESCRIPTION OF THE INVENTION

The present invention describes a method for compensating for missing radar return information within a frame thus yielding clearer SAR images. The concepts herein are applicable for use with the Range Migration Algorithm (RMA) or any other convolution based algorithm for SAR image rendition from pulses collected in a periodic fashion.

The structure of the RMA is based on a convolution. Generally, it consists of a two dimensional Fourier transform, then a multiply operation, a change of variables to get to rectilinear coordinates, and finally an inverse Fourier transform. The present invention is applied after the Stolt interpolator.

Figure 1:
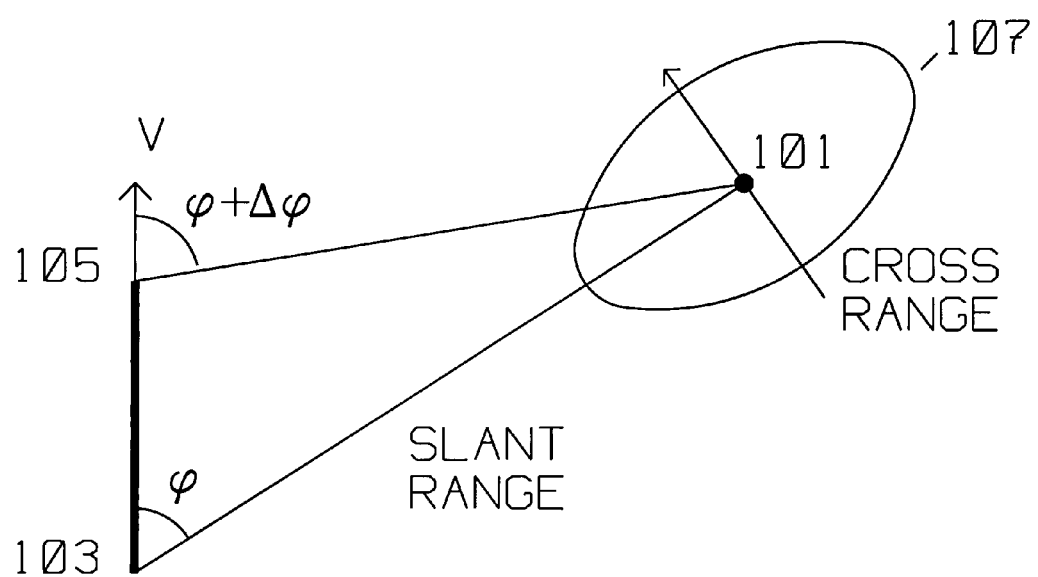
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during the frame length, and includes target area 101. Similarly, the antenna receive pattern covers area 107, and includes target area 101. Radar pulses are transmitted and corresponding returns received at many points during the frame length between position 103 and position 105.

Another alternative during SAR operation is "search" mode. Here, a strip of ground is covered by a moving platform generating a SAR image as it progresses along its path. Both types of SAR radar are well known in the art and, for example, are described by W. Carrara, et al, in *Spotlight Synthetic Aperture Radar*, Artech house, 1995, incorporated herein be reference in its entirety.

Motion compensation is the process of digital correction of radar phase error for each radar return in a SAR frame forming a SAR image due to the change in position of scatterers relative to the moving platform as it acquires radar returns. Motion compensation is performed in the airborne processor on each radar return. The exact form of motion compensation depends on the method used to compile the SAR image from the radar returns. This invention is compatible with the Range Migration Algorithm (RMA), a convolutional algorithm. RMA is preferred because it is better suited to many advanced image analysis techniques such as coherent change detection.

Figure 2:
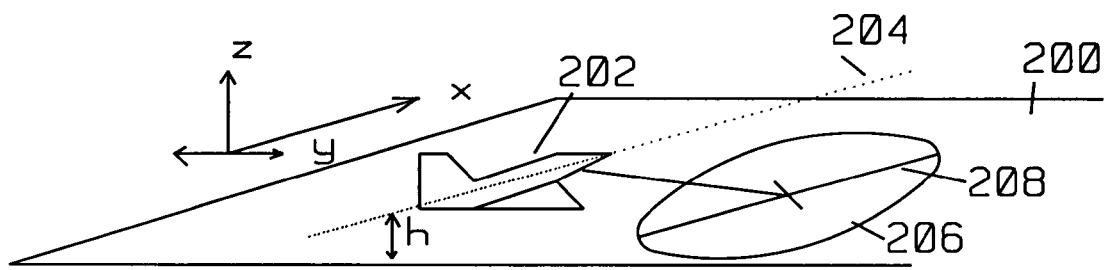
FIG. 2 shows a path of a moving platform (flying aircraft) defining straight and level path along the centerline of a scene to be acquired for a SAR image.

An assumption in RMA is that the nominal flight path of the moving platform (flying aircraft) during the SAR frame is in a straight line parallel to the centerline of the scene being acquired, where the scene is flat. The radar returns received depicting the scene are periodic, evenly spaced in time thus compatible with the functions (e.g. FFT) used in RMA. Aircraft ideal track is a straight line, the scene is flat, in a plane parallel to the flight track, as shown in FIG. 2. Aircraft 202 is following flight path 204 in the x direction, at an altitude h above flat area 200 and acquiring SAR image of scene 206. Scene 206 has a centerline 208, where centerline 208 is parallel to flight path 204. In FIG. 2, x direction is the direction of flight.

y direction is perpendicular to x, parallel to the plane of the scene being imaged.

z direction is normal to the plane of the scene, defined by $\hat{z}=\hat{x}\times\hat{y}$.

I. The RMA Method

Figure 3A:
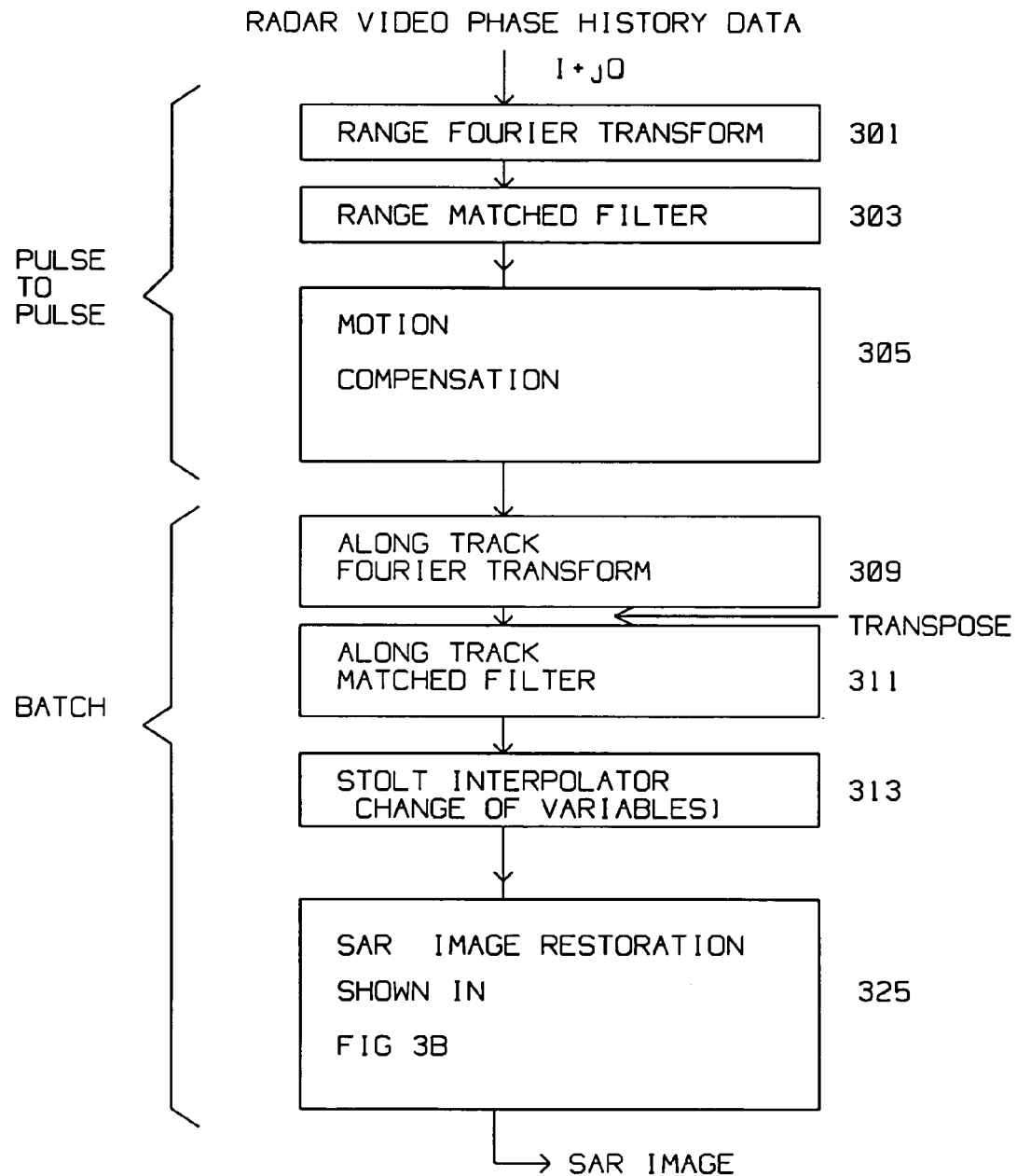
FIG. 3A shows a typical RMA type SAR processing sequence for generating a SAR image from radar returns where this invention is applicable while FIG. 3B further details that portion of RMA where this invention modifies the RMA flow.

FIG. 3A shows briefly, in summary fashion, the steps of a typical, RMA method used in acquiring radar data for generating a SAR image. Radar video phase history data, typically digitized samples of I+jQ, are stored on a per pulse basis, and a range Fourier transform 301 operates on these I+jQ samples. The results are further processed by range matched filter 303. The pulses are then phase aligned using Motion Compensation 305.

An along track Fourier transform 309 is now performed on the data, transposed and presented to along track matched filter 311. The digital stream generated from filter 311 is processed by a Stolt interpolator 313 for a change in variables. After Stolt interpolator 313, SAR image restoration 325 of this invention is performed, as further detailed in FIG. 3B.

Figure 3B:
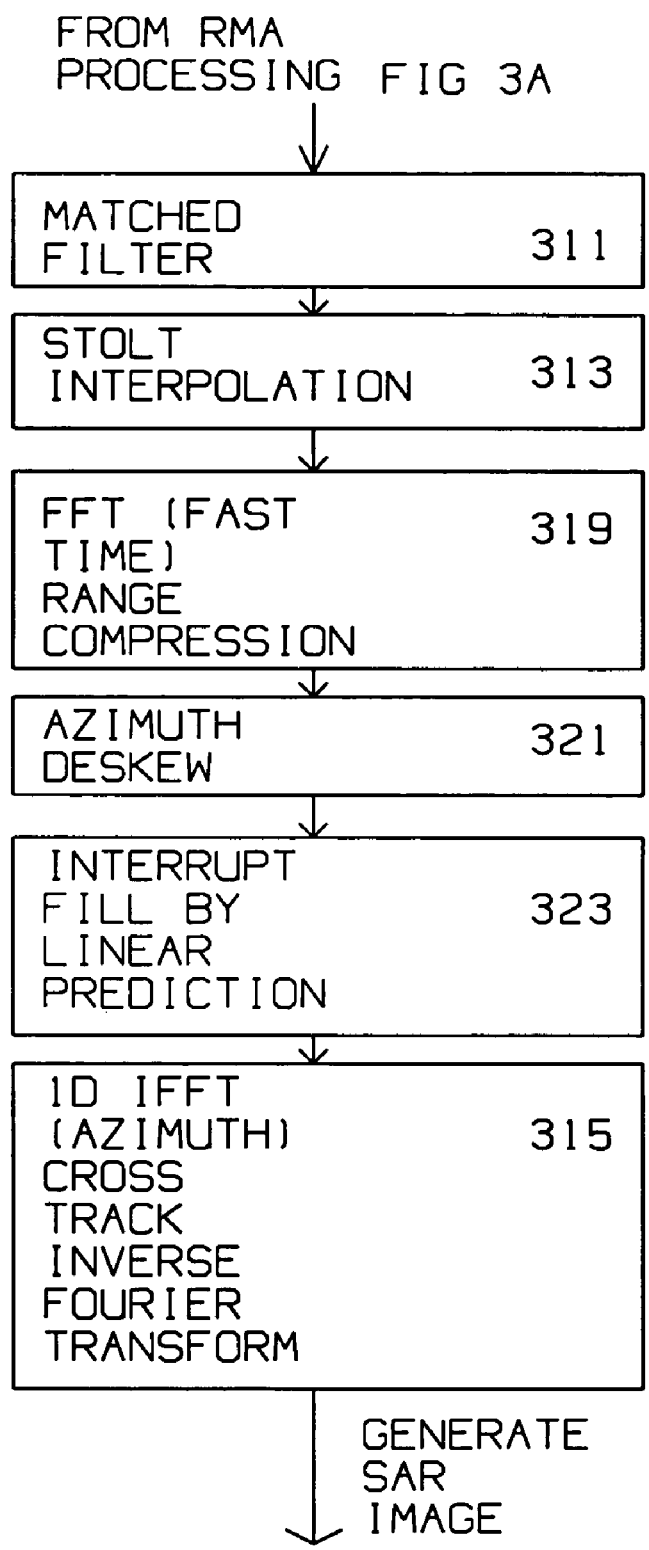

FIG. 3B shows where the present invention fits within the RMA flow. Here, matched filter 311 and Stolt interpolator 313 are the those used in the RMA process. One assumption of the RMA method is that radar returns are digitized for a complete, uninterrupted sequence of pulses where all intended pulses are represented by A/D samples acquired from target/scatterer reflections in the area covered by the SAR image. This assumption is sometimes not fulfilled as some pulses, or portions thereof required by the RMA method may be missing, i.e. there is a (pulse) interrupt.

An important aspect of this invention that distinguishes it from the RMA method is further detailed in FIG. 3B. After the Stolt Interpolation 311, part of a typical RMA processing, the present invention departs by using FFT (Fast Time) Range compression 319 and Azimuth deskew 321 on the digital stream. The output from Azimuth deskew 321 is a deskewed digital stream representative of, and containing, the SAR image. This deskew function is further detailed in U.S. Pat. No. 6,670,907 titled Efficient Phase Correction Scheme for Range Migration Algorithm to Kwang Cho, incorporated herein in its entirety by reference.

Providing Azimuth Deskew 321 is quite beneficial as it lines up the data (digital stream containing the SAR image) for subsequent processing in interrupt fill by linear prediction 323 (discussed below) as well as smoothing the noise present in the SAR image data. It is these twin benefits that allows the linear prediction below to work in this invention.

Interrupt fill by linear prediction 323 fills the voids left from interrupts. 1D IFFT Cross Track Inverse Fourier Transform extracts the SAR image from the resulting digital stream.

II. Modified Forward—Backward Linear Prediction (MF-BLP) Method

Pulse interrupts in a SAR system can raise the sidelobe level in the SAR image by as much as 10 dB if not compensated. Thus they produce significant decrease in image quality. To correct this, the present method describes an approach for interpolating phase history in interrupted SAR case for the Range Migration Algorithm (RMA). It is applicable to both the spot and search modes. It is a canonical approach having two steps.

1. Phase history is processed and aligned in time after the Stolt interpolation 313 in FIG. 3B by applying a quadratic phase on the Fourier transform of the Stolt interpolated phase history. This makes sure the pulse interrupts are synchronous.

This modulation technique also reduces noise and makes the boundaries of the interrupts more clear.

2. A linear prediction type algorithm is applied to the range compressed phase histories to interpolate the missing slow-time data. This optimizes the signal processing to perform the interpolation. It is model based. The method estimates a model order for the number of scatterers in each range cell and applies the Modified Forward Backward Linear Prediction (MFBLP) technique to perform the gap fill for the missing pulses. Architecture for a fast implementation using a sub band filter approach is also described in FIGS. 6 A and 6 B.

Figure 4:
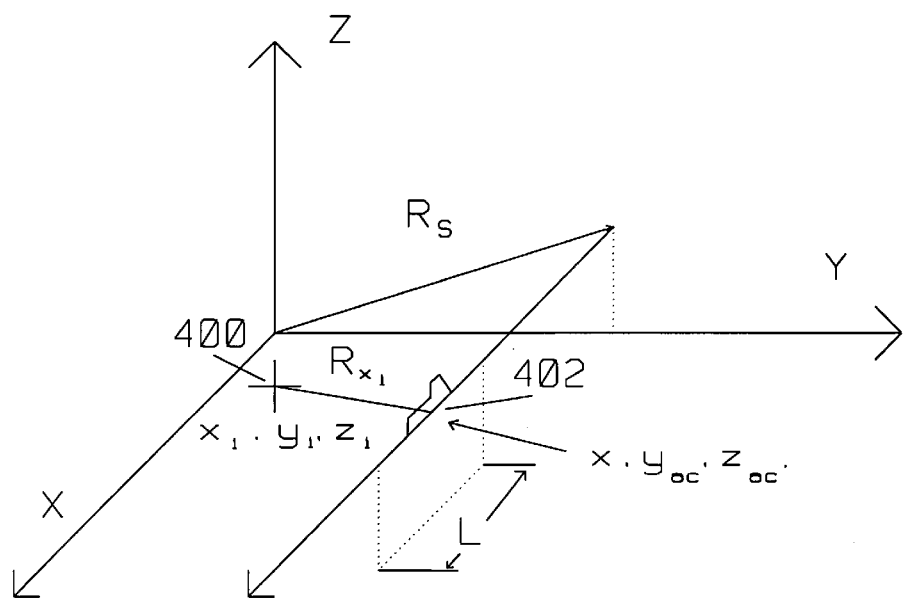
FIG. 4 is shows the geometry used for the application of this invention.

FIG. 4 describes the geometry and coordinates used in the RMA. The radar flying along the x-axis covering an frame length (aperture) equal to L. The position of the antenna phase center is $(x, y_\alpha, z_\alpha)$ on moving platform (aircraft) 402 and a scatterer 400 location is: $(x_i, y_i, z_i)$.

$R_s$ is the distance from the antenna phase center to the reference line on the ground.

After motion compensation to the antenna path, the return from the scatterer can be modeled, for the search mode case as $$S_i(x, K_R) = a_{ti} g(x - x_p K_R) \exp(j K_R (R_{x_i} - R_s))$$

Where $a_{t_i}$=complex scatterer amplitude $$K_R = \frac{4\pi}{\lambda} = \text{spatial radial frequency}$$

$$R_{x_i} = \sqrt{(x-x_i)^2 + R^2_{B_i}}$$

$$R^2_{B_i} = (y_\alpha - y_i)^2 + (z_\alpha - z_i)^2$$

g=azimuthal antenna pattern; g is 0 for x corresponding to pulse interrupt positions.

For the spot mode case the antenna pattern g depends on the scatterer position but is constant over the aperture.

SPOT Mode Analysis.

In SPOT mode, before performing Along Track Fourier Transform 309, scatterers are illuminated simultaneously by the antenna and thus interrupts are synchronous in time for all scatterers. However after Along Track Fourier transform 309 scatterers will appear shifted in spatial frequency $K_z$ in proportion to their x-coordinate as shown in FIG. 5.

Interrupts will also exhibit the same shift.

After the Stolt interpolation the return from a scatterer will be:

$$s_{Stolt}(K_X, K_Y) = a_t \, pi(K_X, K_Y) rect\left[\frac{K_R - 4\pi f_c/c}{4\pi \gamma T_P/c}\right]$$

$$rect\left[\frac{K_X R_B}{LK_Y} + \frac{X_\alpha c - X_t}{L}\right] e^{-j[K_X X_i + K_Y(R_B - R_g)]}$$

pi($K_X$, $K_Y$)=pulse interrupt modulation on the uninterrupted Stolt return.

To allow exploitation of the scatterer content of a return, the return is compressed with respect to $K_Y$ (range) and aligned for the timing of the interrupts. For this, the return signal is shifted in proportion to the location of the scatterer in the X direction. This is done by applying a quadratic phase modulation to the complex image in the spatial domain. This is also known as Azimuth Deskew. A beneficial effect of applying Azimuth Deskew in this instance is that it cleanses the interrupted slow time signal shape.

Search Mode Analysis.

In search mode, as contrasted to spotlight mode, scatterers are illuminated at different times by the radar antenna, depending on their X coordinate location. Thus, interrupts appear on each scatterer response at times proportional to their X coordinate, however they are synchronous, i.e. they appear at the same time. After the along track FFT, the antenna patterns become aligned, however interrupt position has shifted in proportion to the scatterer X coordinate. This is solved by performing azimuth deskew after Stolt interpolation which makes the interrupt samples align in spatial frequency $K_x$. Now the scatterers are isolated in range cells and linear prediction interpolation is applied to interpolate across the interrupts.

Interrupt Fill Using Linear Prediction

After azimuth deskew, the response from a point scatterer resembles that of an interrupt pulse train, while before the interrupt it appears substantially degraded due to the processing, especially from the Along Track FFT and Stolt interpolation. Therefore, the azimuth deskew operation not only shifts in spatial operation in proportion to the X coordinate, but also filters some of the signal processing noise in the signal.

Figure 5A:
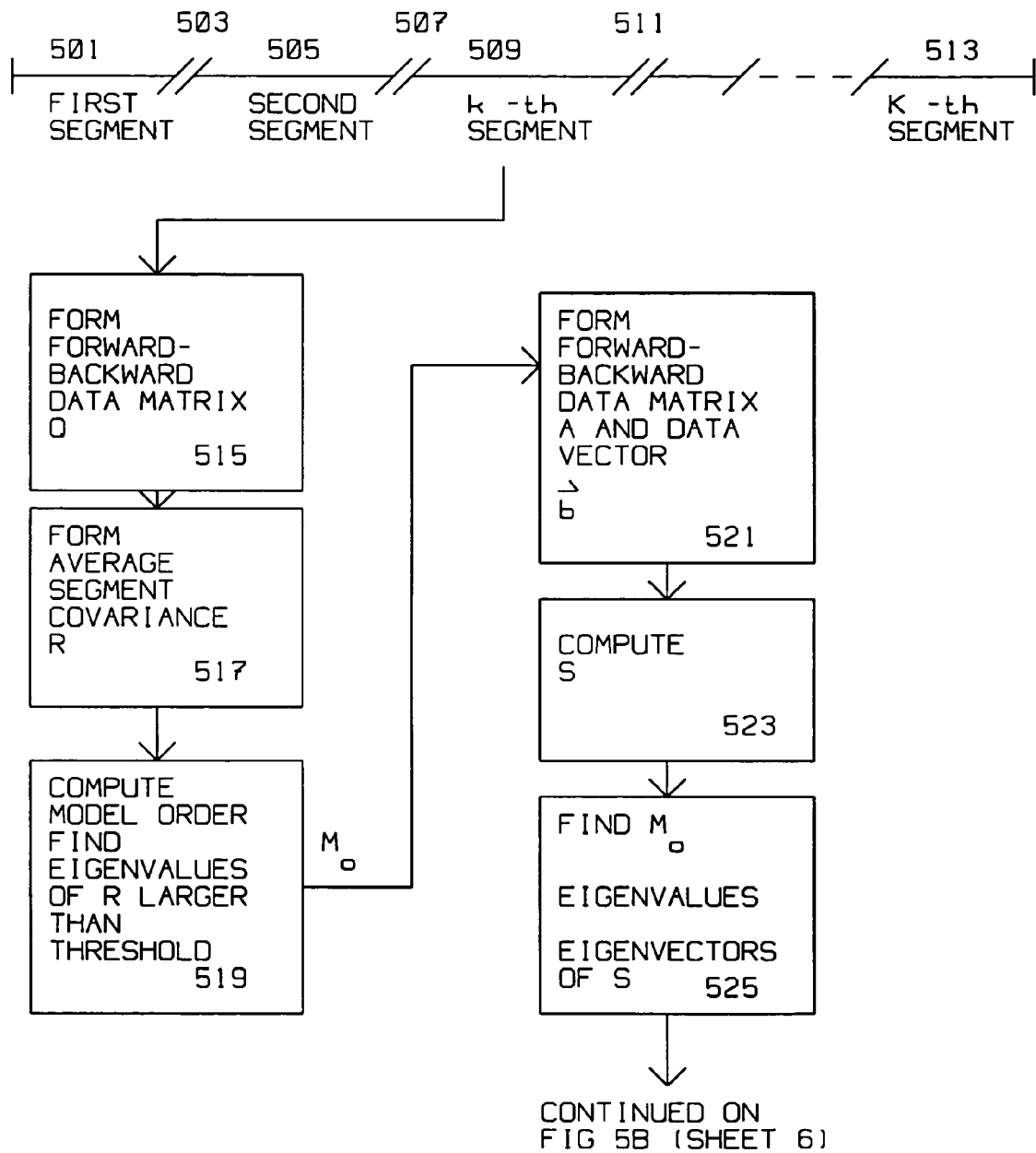
FIGS. 5A and 5B is a flow diagram descriptive of the general steps used in the method and apparatus of this invention.
Figure 5B:
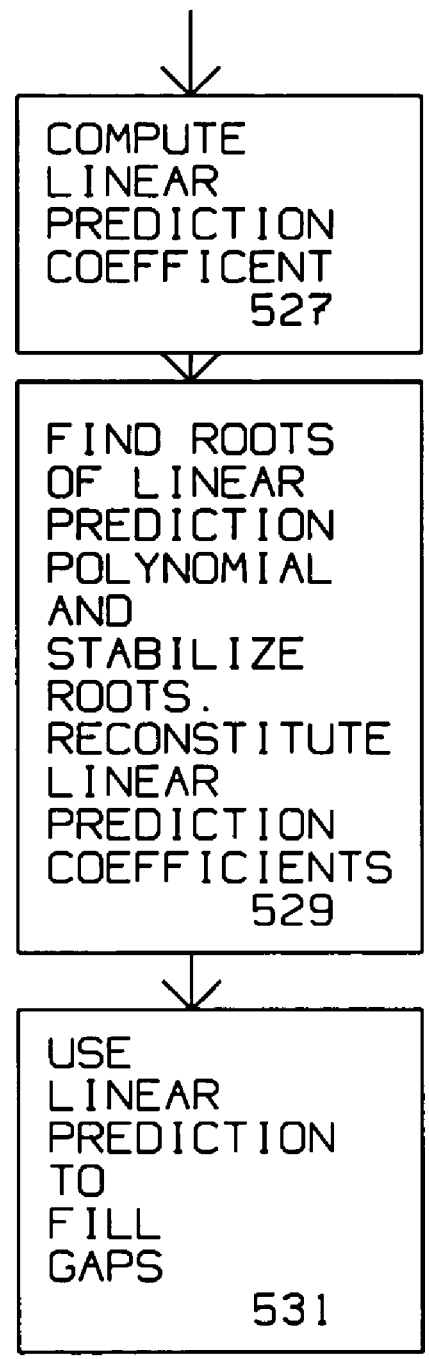

The linear prediction paradigm before it is applied needs to have a model order on the number of scatterers represented in the range compressed $K_x$ samples. A model order on the number represented in the range compressed $K_X$ samples is found before the linear prediction paradigm is applied. As shown in FIGS. 5A and 5B, define a square forward-backward data matrix from the samples. First segment 501 is separated from second segment 505 by interrupt 503. Second segment 505 is separated from $k^{th}$ segment 509 by interrupt 507. $K^{th}$ segment completes the SAR image. The pulse structure is interlaced with interrupts (i.e. missing pulses) such as 503, 507, 511. Each segment such as 501, 505, 509 or 513 is a fully populated train of pulses.

Samples $\{s_{n,r}\}_n^{N'}=1$ are extracted in the $K^{th}$ segment 509 to form forward-backward square data matrix Q 515. r denotes range cells. Q is made square by choice of $$K = \frac{(2N'-1)}{3}$$

$$Q = \begin{bmatrix} s_{1,r} & s_{2,r} & \cdots & s_{K,r} & s_{K+1,r} \\ s_{2,r} & s_{3,r} & \cdots & s_{K+1,r} & s_{K+2,r} \\ \vdots & \vdots & \cdots & \vdots & \vdots \\ s_{N'-K,r} & s_{N'-K+1,r} & \cdots & s_{N'-1,r} & s_{N',r} \\ --- & --- & --- & --- & --- \\ \bar{s}_{K+1,r} & \bar{s}_{K,r} & \cdots & \bar{s}_{2,r} & \bar{s}_{1,r} \\ \bar{s}_{K+2,r} & \bar{s}_{K+1,r} & \cdots & \bar{s}_{3,r} & \bar{s}_{2,r} \\ \vdots & \vdots & \cdots & \vdots & \vdots \\ \bar{s}_{N',r} & \bar{s}_{N'+1,r} & \cdots & \bar{s}_{N'-K+1,r} & \bar{s}_{N'-K,r} \end{bmatrix}$$

Note that $\bar{s}$ are complex conjugates.

Next, the average segment covariance matrix R 517 is computed by:

$$R = \sum_k Q^{(k)}(Q^{(k)})^* I$$

Subsequently, the model order $M_0$ of the scatterers in the data can be estimated using Compute Model Order 519. Here, the number of eigenvalues of R that are above a noise threshold are found. Once the model order $M_0$ is computed, the MFBLP algorithm is applied to interpolate in between the available samples and thus fill the sample gaps due to interrupts. The MFBLP algorithm has been shown to produce accurate scatterer parameter extraction from radar returns even at moderate signal-to-noise ratios.

Using all the available sample segments as indicated in FIGS. 5A and 5B, linear prediction equations are computed to have a prediction order equal to 75% of the average data segment length. The forward and backward data matrix A and data vector $\vec{b}$ 521 is formed by:

$$s_{n,r} = \sum_{p=1}^{P} \alpha_{P+1-p} s_{n-p,r}; \quad \bar{s}_{n-P} = \sum_{p=1}^{P} \alpha_{P+1-p} \bar{s}_{n-P+p,r}; \Leftrightarrow$$

$$\begin{bmatrix} A_F \\ -- \\ A_B \end{bmatrix} \begin{bmatrix} \alpha_1 \\ \vdots \\ \alpha_P \end{bmatrix} = \begin{bmatrix} \vec{b}_F \\ -- \\ \vec{b}_B \end{bmatrix}; A\vec{\alpha} = \vec{b}$$

Explicitly the data matrix $A^{(k)}$ and data vector $\vec{b}^{(k)}$ are expressed as:

$$A^{(k)} = \begin{bmatrix} s_{1,r} & s_{2,r} & \cdots & s_{K-1,r} & s_{K,r} \\ s_{2,r} & s_{3,r} & \cdots & s_{K,r} & s_{K+1,r} \\ \vdots & \vdots & \cdots & \vdots & \vdots \\ s_{N'-K,r} & s_{N'-K+1,r} & \cdots & s_{N'-2,r} & s_{N'-1,r} \\ --- & --- & --- & --- & --- \\ \bar{s}_{K+1,r} & \bar{s}_{K,r} & \cdots & \bar{s}_{3,r} & \bar{s}_{2,r} \\ \bar{s}_{K+2,r} & \bar{s}_{K+1,r} & \cdots & \bar{s}_{4,r} & \bar{s}_{3,r} \\ \vdots & \vdots & \cdots & \vdots & \vdots \\ \bar{s}_{N',r} & \bar{s}_{N'-1,r} & \cdots & \bar{s}_{N'-K+2,r} & \bar{s}_{N'-K+1,r} \end{bmatrix};$$

$$\vec{b}^{(k)} = \begin{bmatrix} s_{K+1,r} \\ s_{K+2,r} \\ \vdots \\ s_{N',r} \\ --- \\ \bar{s}_{1,r} \\ \bar{s}_{2,r} \\ \vdots \\ \bar{s}_{N'-K,r} \end{bmatrix}$$

$K = 0.75 * N'$ where $$A = \begin{pmatrix} A^{(1)} \\ \vdots \\ A^{(K)} \end{pmatrix}$$

$$\vec{b} = \begin{pmatrix} \vec{b}^{(1)} \\ \vdots \\ \vec{b}^{(K)} \end{pmatrix}$$

To compute S 523 consider $$S = \sum_k (A^{(k)})^* A^{(k)}$$

The MFBLP technique is used next to solve the equation:

$$A\vec{\alpha} = \vec{b}$$

or rather its equivalent form:

$$A^*A\vec{\alpha} = A^*\vec{b}$$

by an eigen-decomposition of the forward-backward data matrix A*A, which cleanses the noise in the data samples. Find $M_0$, eigenvalues and eigenvectors of S 525 is used with MFBLP. In 525, MFBLP finds an equivalent matrix $A_{M_0}$ of rank $M_0$ that is closest to the unclean forward-backward data matrix A in a least square sense. This is the matrix of the same size as A which consists of the largest $M_0$ singular values of A and the corresponding singular vectors.

In compute linear prediction coefficient 527 the solution for the linear prediction coefficients, as shown in FIGS. 5A and 5B is given by:

$$\vec{\alpha} = \sum_{m=1}^{M_0} \frac{1}{\lambda_m} [\vec{e}_m^* (A^* \vec{b})] \vec{e}_m$$

where $\{\lambda_m\}$, $\{\vec{e}_m\}$ are the eigenvalues and eigenvectors of A*A, and the notation A* means complex conjugate transpose.

Next, the corresponding linear prediction polynomial is formed and its roots extracted. The roots that are less than or equal to one in magnitude are kept. This insures that the forward data prediction to fill the interrupts is stable. If a root is larger than 1, its magnitude is forced to be 1.

Now, in Find Roots of Linear Prediction polynomial and stabilize roots/Re-constitute Linear Prediction coefficients 529, the linear prediction coefficients are reconstituted with the stable roots and gap fill is done by predicting forward.

Continuing, in Use Linear Prediction to Fill Gaps 531 the backwards linear prediction equations are used to predict backwards and fill interrupts in a similar fashion.

Here,
$\{\hat{a}_i\}_1^{M_0}$
are the linear prediction coefficients.

The linear prediction to fill gaps is $$x_{(k-1)N_K+n} = -\sum_{i=1}^{M_0} \hat{a}_i x_{(k-1)N_K+n-i}$$

where $n = N_K - L, \ldots, N_k$ $k = 1, \ldots, K$

A weighted average of the backwards and forwards linear predictions may be used at an interrupt sample to increase its accuracy if the interrupt does not fall near either end of the samples. In general, the method herein interpolates well for information contained in missing pulses. When the number of samples in between interrupts is large (greater than 150), use a sub-band filtering technique which allows to process each sub-band separately and thus leads to a substantial decrease of the computational load of at least one order of magnitude. This approach is similar to the one shown in FIGS. 5A, 5B except that it is applied to the output of each sub-band filter. This is described in FIGS. 6A and 6B.

Figure 6A:
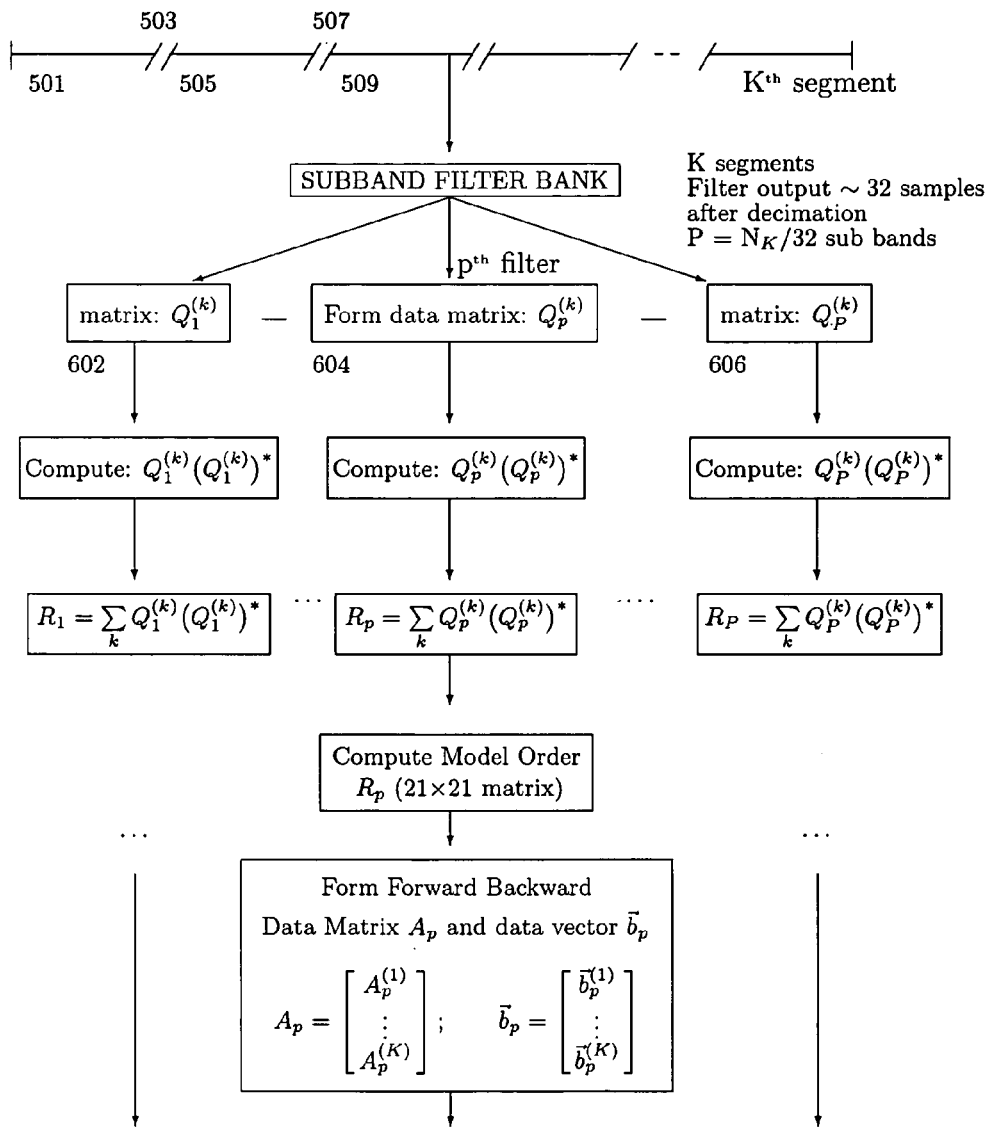
FIGS. 6A and 6B is a flow diagram using the steps outlined in FIG. 5 in conjunction with a sub-band filter bank to reduce the computational load.
Figure 6B:
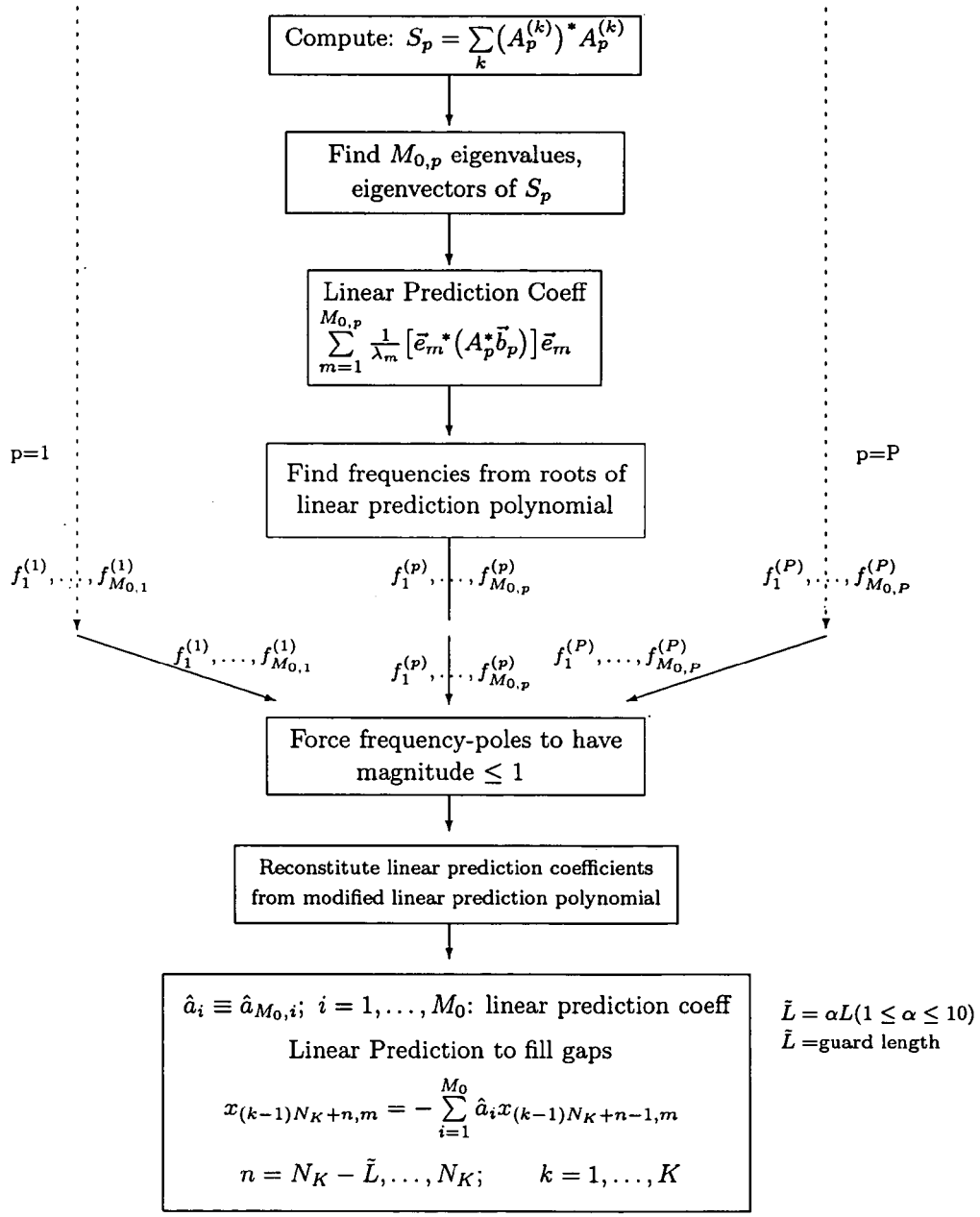

In FIGS. 6A and 6B, $x_{n,m}$=N×M slow time x range compressed phase history;
K=number of pulse interrupts (L pulses each);

$$N_K \equiv \left[\frac{N}{K}\right] = \# \text{ of pulses (segment + interrupt)}.$$

An example is shown for 3 filters, filter 602 generating matrix $Q_1^{(k)}$, filter 604 generating matrix $Q_P^{(k)}$, and filter 606 generating matrix $Q_P^{(k)}$.

For each filter in FIGS. 6A and 6B as shown, the same general principle is used as in FIGS. 5A and 5B.

All references cited in this document are incorporated herein in their entirety by reference.

Although presented in exemplary fashion employing specific embodiments, the disclosed structures are not intended to be so limited. For example, the concepts presented herein can also be applied in conjunction with the polar formatting algorithm used instead of the RMA algorithm in some cases.

Those skilled in the art will also appreciate that numerous changes and modifications could be made to the embodiment described herein without departing in any way from the invention.

What is claimed is:

1. A radar for acquiring a synthetic aperture image from a sequence of periodic pulse returns, said sequence of periodic pulse returns interspersed with interrupts, said interrupts marking the start and end of one or more segments, said segments containing said periodic pulse returns, said radar comprising:

analog to digital converter for converting said pulse returns into a digital stream;

a computer for:

receiving said digital stream;

performing an azimuth deskew on said digital stream to obtain a deskewed digital stream;

forming a forward-backward data matrix from said deskewed digital stream for said one or more segments;

forming an average segment covariance from said forward-backward data matrix;

computing a model order for said average segment covariance;

computing one or more linear prediction coefficients using data contained in said forward backward data matrix, and said model order;

using said one or more linear prediction coefficients to compute missing pulse returns belonging within said interrupts.

2. A radar system as described in claim 1 wherein said digital stream is processed using a Stolt interpolator, said missing pulse returns introduced after said Stolt interpolator.

3. A radar system as described in claim 1 wherein said computing of said model order finds eigenvalues larger than a threshold.

4. A radar system as described in claim 3 wherein said radar uses sub-bands to decrease computing time for said missing pulse returns.

5. A radar system as described in claim 4 wherein said computer finds roots of a linear prediction polynomial, stabilizes said roots to obtain stabilized roots, and reconstitutes said linear prediction coefficients using said stabilized roots.

6. A method for acquiring a synthetic aperture image from a sequence of periodic pulse returns, said sequence of periodic pulse returns interspersed with interrupts, said interrupts marking the start and end of one or more segments, said segments containing said periodic pulse returns, said method comprising the steps of:

converting said pulse returns into a digital stream;

performing an azimuth deskew on said digital stream to obtain a deskewed digital stream;

forming a forward-backward data matrix from said deskewed digital stream for said one or more segments;

forming an average segment covariance from said forward-backward data matrix;

computing a model order for said average segment covariance;

computing one or more linear prediction coefficients using data contained in said forward backward data matrix, and said model order;

using said one or more linear prediction coefficients to compute missing pulse returns belonging within said interrupts.

7. A method as described in claim 6 wherein said digital stream is processed using a Stolt interpolator, said missing pulse returns introduced after said Stolt interpolator.

8. A method as described in claim 6 wherein said step of computing of said model order finds eigenvalues larger than a threshold.

9. A method as described in claim 8 wherein sub-bands are used to decrease computing time for said missing pulse returns.

10. A method as described in claim 9 wherein roots of a linear prediction polynomial are computed, said roots are stabilized to obtain stabilized roots, and said linear prediction coefficients are reconstituted using said stabilized roots.

* * * * *